United States Patent [19]

Behn et al.

[11] 4,376,329
[45] Mar. 15, 1983

[54] METHOD FOR PRODUCING AN IMPROVED ELECTRICAL LAYER CAPACITOR

[75] Inventors: Reinhard Behn, Munich; Horst Pachonik, Unterhaching; Gerhard Seebacher, Munich, all of Fed. Rep. of Germany

[73] Assignee: Siemens Aktiengesellschaft, Berlin & Munich, Fed. Rep. of Germany

[21] Appl. No.: 207,699

[22] Filed: Nov. 17, 1980

Related U.S. Application Data

[62] Division of Ser. No. 78,942, Sep. 26, 1979, abandoned.

[30] Foreign Application Priority Data

Oct. 5, 1978 [DE] Fed. Rep. of Germany ....... 2843581

[51] Int. Cl.³ ............................................. H01G 7/00
[52] U.S. Cl. ................................... 29/25.42; 427/41;
427/79; 361/309
[58] Field of Search .................. 29/25.42, 418; 427/41;
361/304, 309, 308, 313

[56] References Cited

U.S. PATENT DOCUMENTS

| 2,731,706 | 1/1956 | Grouse | 29/25.42 |
| 3,069,283 | 12/1962 | Coleman | 427/41 |
| 3,102,216 | 8/1963 | McGraw, Jr. | 317/242 |
| 3,710,211 | 1/1973 | Behn et al. | 317/261 |
| 4,153,925 | 5/1979 | Gazard et al. | 427/41 |

Primary Examiner—Francis S. Husar
Assistant Examiner—P. W. Echols
Attorney, Agent, or Firm—Hill, Van Santen, Steadman, Chiara & Simpson

[57] ABSTRACT

A layer capacitance is disclosed having small dimensions and a high capacitance per volume. A carrier is coated on two frontal sides with metal contact layers. Metal layers and gas discharge polymerization layers are arranged one over the other in alternating fashion upon the carrier. On each of the two surfaces of the carrier, the metal layers extend to the contact layers where they are electrically connected.

5 Claims, 4 Drawing Figures

METHOD FOR PRODUCING AN IMPROVED ELECTRICAL LAYER CAPACITOR

This is a division of application Ser. No. 078,942, filed Sept. 26, 1979 and now abandoned.

BACKGROUND OF THE INVENTION

The invention concerns an electrical layer capacitor which can be regenerated. Metal layers serving as coatings and insulating material layers of dielectrics are arranged one over another in alternating fashion upon a carrier of insulating material. The metal layers of one coating extend to one side of the capacitor and those of another coating extend to the other side of the capacitor and extend beyond the dielectric layers. Border regions of the metal layers of the coatings extend beyond the dielectric layers and are arranged one over the other without insulating layers in between. The border region of the coating is connected with the associated lead element in electrically conductive fashion. Said coating comprises all metallisations of one polarity which are joined together.

A capacitor construction of this sort is known from British Patent 970,865. There, a carrier is used into which lead elements are set. The metal surfaces of the coatings are evaporated such that they encompass in each case a lead element. Metal compounds which are produced upon each metal layer serve as dielectric layers.

The construction according to the state of the art is not capable of being regenerated and is not suitable for miniaturization since the lead elements have their largest extension in the direction of the carrier. And since the carrier must have significant solidity, a significant thickness is required in order to contain the mechanical forces which occur at the lead elements during the processing. Besides this, a satisfactory insulating layer cannot be realized without difficulties because of conversion of the metal into a metal compound upon a thin metal coating. A self-healing capacitor cannot be produced in this manner.

SUMMARY OF THE INVENTION

It is an object of the present invention to have significantly smaller dimensions in the case of a capacitor of the kind specified above, to achieve a capacitor which is suitable for hybridization, to provide a high capacitance per volume and to provide such a capacitor at low cost.

This problem is solved according to the invention in that the carrier has frontal surfaces (sidewall) in the region of the border regions of the coatings. These frontal surfaces are layered over with at least one contacting layer made of metal. The border regions of the coatings at least partially overlap the edges of these metal layers.

The invention has the advantage that the contact layers do not enlarge the dimensions of the capacitor to an extent worth mentioning, and the stress of the contact layers as well as of the carrier during handling of the capacitor is extremely small and therefore the thickness of the carrier can also be chosen relatively small. In order to provide an embodiment which is easy to solder and can be hybridized, the frontal surfaces are coated over with a first layer made of a solderable high melting metal, and with a second layer made of a soldering metal. The border regions of the coatings partially overlap the edges of at least one contact layer. An embodiment which is easy to produce is provided since the carrier has a cross-section which is at least approaching rectangular in the direction perpendicular to the contact layers. A particularly secure contacting is attained if the contact layers completely cover the corresponding frontal surfaces.

A sufficient heat resistance is guaranteed for hybridization of the capacitors, for example with reflow soldering, if the dielectric layers consist of a product of gas discharge polymerization. (Gas discharge polymerization techniques are known from U.S. Pat. No. 3,068,510, Col. 1, lines 10–32 and Col. 2, lines 1–12, incorporated herein by reference). Besides this, with the use of products of a gas discharge polymerization, particularly advantageous values of the capacitor data are attained, in particular a high capacitance per volume and a low dissipation factor. Also with the products of gas discharge polymerization, satisfactorily regenerating capacitors can be produced. Furthermore, gas discharge polymerization renders possible the polymerization of gases which cannot be polymerized in another manner. For this application, a product of gas discharge polymerization comprising cyclohexane, for example, is suitable. The number of layers which are arranged one over the other can be varied within a broad range. It is advantageous for the capacitor to contain approximately 100 gas discharge polymerized layers and approximately 100 aluminum layers, whereby the aluminum layers display a thickness of approximately 30 nm. This embodiment is still satisfactorily regenerable and makes possible, for example, capacitor dimensions of only 3 mm × 1.3 mm × 1 mm. The dielectric layers can thereby be less than 1 $\mu$m thick.

Capacitors of the kind described can be advantageously produced by means of a method wherein a carrier band is produced from the insulating material with the width desired in the capacitor. This carrier band on its narrow longitudinal side has frontal surfaces and is provided on its frontal surfaces with at least one contact layer out of a material which is non-melting at the temperature of the customary soldering process during mounting of components. At least one surface of this carrier band is vapor-deposited with a value metal layer. (A layer comprised of metals having the valve effect, i.e. Al, Ta . . . ) Upon this valve metal layer, a gas discharge polymerization layer is polymerized on in a gas by means of an electrical glow or gas discharge. Upon this gas discharge polymerization layer, a second metal layer is evaporated, and over this, further gas discharge polymerization layers are polymerized on and metal layers are evaporated on. Regions which are not to be layered are covered by masks both in the case of evaporating on of the metal layers as well as in the case of polymerizing on of the polymerization layers from the gas phase. The capacitor strips which arise in this manner are separated into individual capacitors. This separation can proceed in strips which are free of coating between regions which are capacitively active. However, it can also proceed through the coatings. For this, for example, cutting of the capacitor strip with a shear or something similar is suited. Also, by cutting the capacitor strip, a satisfactory insulation of the coatings with respect to one another results.

The proposed invention offers simple assembly possibilities wherein the carrier band is layered on two of its frontal (sidewall) surfaces with a first layer made of a high melting metal and a second layer made of a soldering metal. After the application of the polymerization layers and of the metal coatings, connection wires are sealed into the solder metal layers. As a solder metal, tin is particularly suitable.

A simple production of a large number of the proposed capacitors is made possible since a foil of high melting metal is laminated to both sides of an insulating synthetic material plate, the thickness of which corresponds to the width of the carrier. An overlay of a soldering metal is applied onto this metal foil which has been laminated on. The plate is then separated into strips of the thickness of the carrier which is needed in the capacitor. The metal and gas discharge polymerization layers are applied onto the cut surfaces and then the capacitors are separated from the capacitor strips which were formed in that manner. As a first high melting contact layer, a 35 μm thick copper foil is suitable. Onto this, a tin layer is applied. This suffices in making possible a satisfactory connection to the capacitor or the soldering in of connection leads. It is advantageous for the production of large quantities of capacitors if several carrier strips are placed next to one another and are supplied with the corresponding layers at the same time. Aluminum is particularly suited as a coating material. The tin layer can, for example, be applied electrogalvanically or by means of dipping. Before the dividing of the capacitor strips into individual capacitors, an additional insulating material film or a lacquer layer can be applied for the protection of the dielectric layers. As a material for the carrier, epoxy resin is suitable since this synthetic material displays a sufficient heat stability.

A satisfactory sharp limitation of the layers which are applied is attained in that the surfaces which are to be coated are covered with masks and wherein the masks are brought as close to the surfaces to be coated as possible. This is important in particular for the production of the polymerization layers, since even slight layer thicknesses in the edge regions which are to be contacted will bring about a poor contact. The covering with masks which lie directly adjacent the surfaces to be layered is also possible in the case of the production of polymerization layers which are designed to be relatively thick, since tapering polymerization layers form in the vicinity of the edge of the masks. Therefore, masks which lie directly upon the surfaces to be coated can easily be removed after the coating. By this technique, layers can be produced which are very precisely limited and which lie over one another congruently. A construction is possible with very narrow tolerances.

DESCRIPTION OF THE PREFERRED EMBODIMENTS

Figure 1:
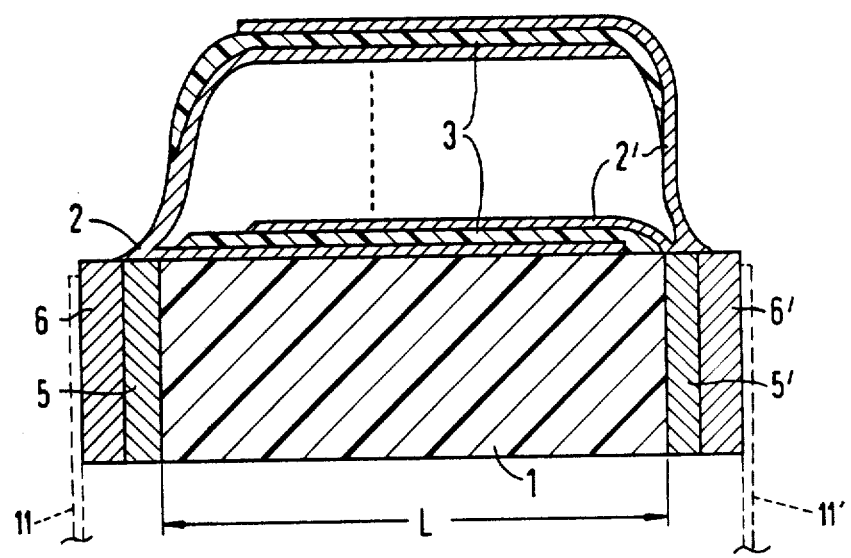
FIG. 1 shows schematically in sectioned view a capacitor according to the invention.

A carrier 1 of insulating material which has a width L desired in the capacitor, is layered on both sides with a higher melting contact layer 5, 5' and a soldering layer 6, 6'. In each case, metal layers 2 or, respectively, 2' as a metallic coating are arranged upon this carrier 1. These metal layers are separated from one another by means of gas discharge polymerization layers 3. The metal layers 2 or, respectively, 2' partially overlap the contact layers 5 and 6, or respectively, 5' and 6'. Connection elements 11, 11' are soldered to the solderable metal layers 6, 6' respectively.

Figure 2:
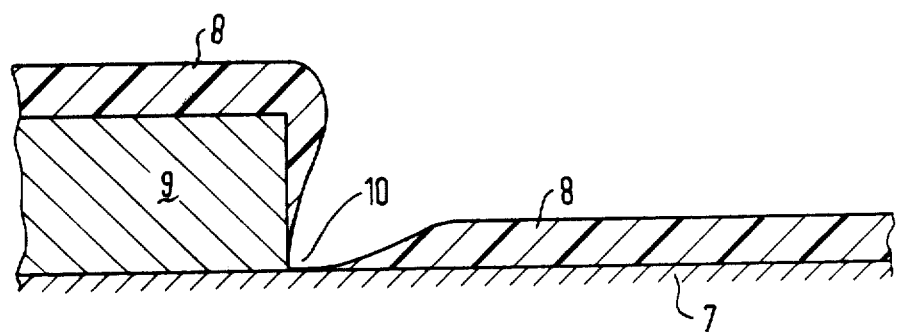
FIG. 2 shows schematically the profile of a gas discharge polymerization layer in the vicinity of a mask.

As shown in FIG. 2, a surface 7 which is to be coated with a product of a gas discharge polymerization is partially covered by a mask 9. The gas discharge polymerization layer 8 becomes thinner in the region of the edge 10 of the mask 9. Its thickness approaches zero. The region which is influenced by the mask corresponds approximately to the thickness of the mask 9. Therefore, the mask 9 can be lifted off without difficulty even after applying thick polymer layers 8. No detachment of the gas discharge polymerization layers 8 from the surface 7 to be coated occurs.

Figure 1A:
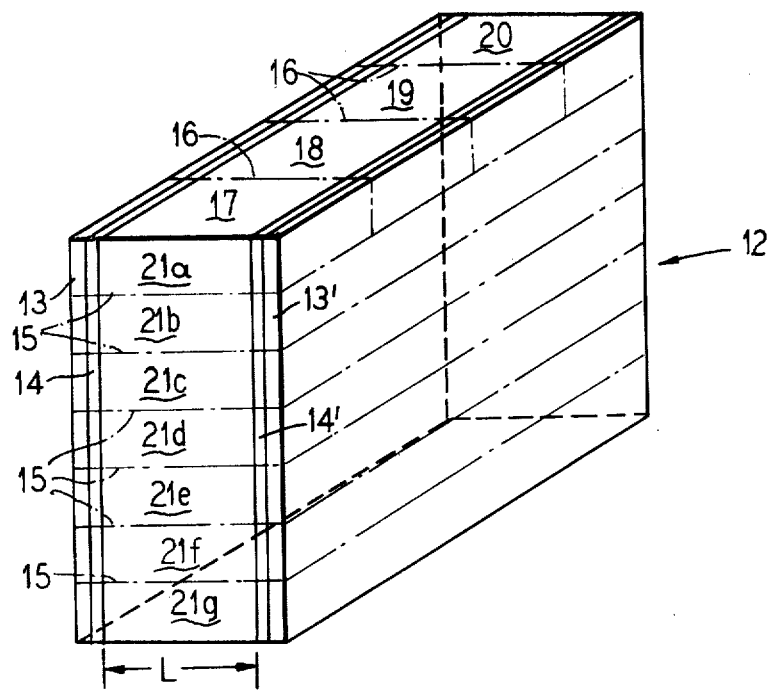
FIG. 1a is a perspective view of an insulating plate from which a plurality of carrier bands used in formation of capacitor strips is formed.

For a simple production of a large number of carrier bands and capacitors, the following techniques are employed. As shown in FIG. 1a, a large insulating synthetic material resin plate 12 is provided having a width "L" corresponding to a width of the desired carrier bands to be employed in manufacturing the individual capacitors. On both major surfaces of the plate 12, a high melting metal layer 14, 14' is applied corresponding to the metal layer segments 5, 5' in FIG. 1. Over the high melting metal layers 14, 14' are respectively applied soldering metal layers 13, 13' corresponding to layers 6, 6' in FIG. 1.

Figure 1B:
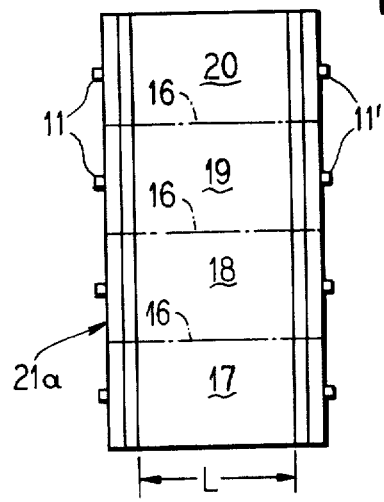
FIG. 1b is a top view of a single carrier band formed from the plate shown in FIG. 1a, the sectioned view of which is shown in FIG. 1.

The plate 12 is now cut into individual carrier bands 21a–21g along cutting lines 15 shown in FIG. 1a. The top carrier band 21a shown in FIG. 1a is shown in a top view in FIG. 1b. After application the glow discharge layers and appropriate capacitive metal layers, the carrier band 21a is cut into individual capacitors such as 17, 18, 19 and 20 shown in FIG. 1a or in FIG. 1b.

We claim as our invention:

1. A method for the production of a capacitor, comprising the steps of:
   providing an insulating synthetic resin plate, a thickness of which corresponds to a width of a carrier band to be employed in producing the capacitor;
   on opposite side walls of the plate sealing on a contact layer of a high melting metal which is non-melting at a temperature of soldering during mounting of the capacitor;
   applying onto the sealed-on metal layers a soldering metal layer;
   separating the plate into the individual carrier bands which are to be later separated into the individual capacitors, the carrier band having top and bottom cut surfaces;
   vapor depositing a valve metal layer on the top surface of the carrier band which extends over a side edge of and into contact with one of the contact layers but not the other;
   applying a flat surface mask over portions of the valve metal layer which are not to be capacitively active in a region of said edge of the contact layer;
   gas discharge polymerizing with an electrical gas discharge a dielectric layer onto the valve metal layer and mask, the dielectric layer tapering to substantially zero thickness at a corner formed between an edge of the mask and the valve metal layer being coated;
   removing the mask and similarly vapor depositing successive metal layers alternating with successive gas discharge polymerization layers with appropriate masks onto the initial polymerization layer such that alternate metal layers connect to the same frontal contact layers; and separating capacitor strips which arise in this manner into the individual capacitors.

2. A method according to claim 1 wherein after application of the polymerization layers and of the metal layers, connection wires are fused into the soldering metal layers.

3. A method according to claim 1 wherein the non-melting contact layer comprises a 35 μm thick copper foil, and the soldering metal is applied as a tin layer on the copper foil.

4. A method according to claim 1 including the step of placing several of said carrier bands next to one another and together vaporizing these bands with the metal layers and layering on with gas discharge polymerization dielectric layers.

5. A method according to claim 1 including the step of applying the masks as close as possible to the surfaces above the contact layer edges which are not to be coated.

* * * * *